Patented June 20, 1950

2,511,891

UNITED STATES PATENT OFFICE 2,511,891

HETEROCYCLIC COMPOUNDS AND THEIR PREPARATION

Richard R. Whetstone, Albany, Calif., assignor to Shell Development Company, San Francisco, Calif., a corporation of Delaware No Drawing. Application December 11, 1948,
Serial No. 64,913

15 Claims. (Cl. 260—338)

This invention relates to new chemical compounds and to a method for their preparation. More particularly, the present invention relates to certain oxygen-containing, heterocyclic compounds, and to a method for their preparation.

The compounds to which the present invention relates may be referred to and defined as containing the bicyclic structural unit

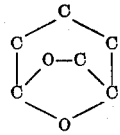

Formula I in which only the essential elements, or atoms, of the cyclic structure are shown, it being understood that the carbon atoms in the structural unit, as it appears in Formula I and in similar structural formula herein, are bonded to sufficient additional atoms or groups of atoms to satisfy the requirements of the laws of valency pertaining to the tetravalency of the carbon atom.

In accordance with the rules of nomenclature described in "The Ring Index. Ring Systems Used in Organic Chemistry," by Patterson and Capell, Reinhold, 1940, the compounds containing this bicyclic structure may be referred to as the 6,8-dioxabicyclo[3.2.1]octanes. According to an alternative mode of nomenclature, the compounds of the present invention could be referred to generically as 2,6-epoxymethanotetrahydropyrans. For the purposes of this latter form of nomenclature, the several positions in the bicyclic structural unit may be designated as follows:

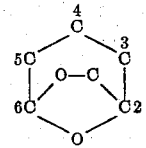

Formula II

When compounds containing the foregoing structural unit are described as dioxabicyclooctanes, it is convenient to refer to the positions in the rings as follows:

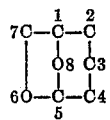

Formula III

In the present specification and claims, naming of the present compounds as dioxabicyclooctanes will be on the basis of this latter designation of positions, and naming of the present compounds as derivatives of tetrahydropyran will be on the basis of the numerical designation of positions expressed in Formula II.

This application is a continuation-in-part of my copending application, Serial No. 749,077, filed May 19, 1947, and it relates particularly to species and a sub-genus of the invention broadly disclosed and claimed therein and further includes subject matter not specifically disclosed in the parent application. The compounds to which the present invention relates are 6,8-dioxabicyclo[3.2.1]octanes in which the carbon atom in position No. 7 of the 6,8-dioxabicyclo[3.2.1]octane nucleus is directly linked to four atoms. The present application claims particularly acetal-type compounds, whereas the specific claims of my aforesaid copending application relate more particularly to 6,8-dioxabicyclo[3.2.1]octane compounds which possess structural characteristics of lactones as contrasted to the present acetal-type members of the generic class.

In accordance with the present invention, acetal compounds containing the foregoing structural unit are prepared by subjecting a derivative of 3,4-dihydro-1,2-pyran having a methanol group attached to the carbon atom in the 2-position of the dihydropyran ring to conditions which favor cyclization reaction leading to their conversion to compounds of the herein defined class. It has been found that the cyclization reaction may be effected by subjecting the stated derivatives of dihydropyran to suitable conditions of temperature and/or suitable conditions of acidity as provided by the presence of an acid or an acid reacting material, for a period of time sufficient to cause the reaction to take place. The compounds thus obtainable are characterized as 6,8-dioxabicyclo[3.2.1]octanes in which the carbon atom in position No. 7 of the bicyclic nucleus is directly linked to four separate atoms. The 6,8-dioxabicyclo[3.2.1]octanes thus obtainable from 3,4-dihydro-1,2-pyran-2-methanols have structures that may be represented by the schematic formula:

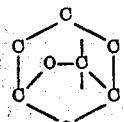

Formula IV

Novel acetal-type 6,8-dioxabicyclo[3.2.1]octane compounds according to the foregoing formulas may be prepared according to the present invention from a wide variety of derivatives of 3,4-dihydro-1,2-pyran that have a methanol group attached to the carbon atom in the 2-position of the hydropyran ring. The derivatives thus employed in the process of the present invention may contain only the methanol extranuclear substituent group, as in the specific compound 3,4-dihydro-1,2-pyran-2-methanol, or they may contain in addition to the methanol group one or more additional univalent groups, or atoms other than hydrogen attached to carbon atoms in the dihydropyran ring. Representative univalent groups, and atoms other than hydrogen which thus may be present include, among others, the following: one or more alkyl groups, such as methyl, ethyl, propyl, isopropyl, the butyls, the pentyls, and homologs thereof; one or more alkenyl groups, such as vinyl, allyl, crotyl, alpha-methylallyl, butadienyl, isopropenyl, and their homologs and analogs; one or more isocyclic groups, including the cycloalkyl groups, such as the cyclohexyl and cyclopentyl groups and their homologs, cycloalkenyl groups such as cyclohexenyl, cyclopentenyl, and homologs thereof, aromatic groups such as phenyl, tolyl, xylyl, benzyl, phenethyl, naphthyl, and the like, heterocyclic groups such as furfuryl, furyl, tetrahydrofurfuryl, tetrahydropyranyl, sulfur-containing heterocyclic groups, analogous and homologous heterocyclic groups; and analogs and homologs and substitution products of the foregoing and related substituent groups. Such additional organic groups may be directly bonded by a univalent carbon-to-carbon bond to a carbon atom of the dihydropyran ring, or they may be connected to a carbon atom of the dihydropyran ring through an intervening atom of an element other than carbon, such as an oxygen atom, a sulfur atom, or the like.

Bicyclic heterocyclic compounds of the herein defined class may have attached to the carbon atom in position No. 7 of the 6,8-dioxabicyclo-[3.2.1]octane nucleus two hydrogen atoms, or one or both of the hydrogen atoms may have been replaced by a univalent substituent group or groups. The substituent groups may be univalent hydrocarbyl groups, such as alkyl, aryl, alkaryl, aralkyl, or the like, or they may comprise, for example, a hydrocarbyl group bonded to the carbon atom of the methanol group through an atom of an element other than carbon, for example oxygen as in alkoxy, aryloxy, acyloxy and similar groups.

The following examples will illustrate certain of the compounds that form the subject of the present invention, and also will illustrate certain specific embodiments of the process by which these and related compounds may be prepared. It will be understood that the examples are presented for the purposes of illustration, and not to limit the invention as it is more broadly described herein and defined in the appended claims. In the examples, the parts are parts by weight.

*Example I*

Four parts of a 1 normal solution of hydrogen chloride in methanol were added to 100 parts of 2,5-dimethyl-3,4-dihydro-1,2-pyran-2-methanol dissolved in 55 parts of methanol. An exothermic reaction occurred. The mixture was maintained at 40° C. to 50° C. for about 1.5 hours. The mixture then was cooled and rendered neutral by contacting with an anion-exchange synthetic resin to selectively remove the hydrogen chloride. The neutral solution was distilled. There were recovered 83 parts of a mobile liquid distilling at 52.8° C. to 53.0° C. under a pressure of 11 millimeters of mercury and having a refractive index ($n_D^{20}$) of 1.4463. This product was identified as having the probable structure of 1,4-dimethyl-6,8-dioxabicyclo[3.2.1]octane (alternatively 2,5-dimethyl-2,6-epoxymethanotetrahydropyran), corresponding to the structural formula

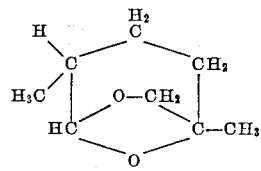

It had an odor suggestive of mint. It was insoluble in water but soluble in dilute aqueous acid upon prolonged agitation. It gave a delayed precipitate when treated with the 2,4-dinitrophenylhydrazone reagent and did not decolorize a solution of bromine in carbon tetrachloride. Analyses of the product as obtained in one experiment are as follows:

|  | Calculated | Found |
| --- | --- | --- |
| Per cent carbon | 67.56 | 67.07 |
| Per cent hydrogen | 9.92 | 9.87 |
| Hydroxyl value, equiv./100 g | 0 | .005 |

*Example II*

Twenty parts of 2,5-dimethyl-3,4-dihydro-1,2-pyran-2-methanol were homogenized with 34 parts of water and 18 parts of glacial acetic acid. After a brief period a second phase appeared in the homogenized mixture. An additional amount of 10 parts of acetic acid, and 1 part of 10 per cent aqueous hydrochloric acid were added and the resultant homogeneous mixture was maintained at 90° C. to 95° C. for 12 hours. The mixture was diluted with water until a second phase formed, the non-aqueous phase was extracted with ether, the ether extract was dried, and distilled. There were recovered 14 parts of the same compound that was prepared in the immediately preceding example.

*Example III*

Fifty-six parts of the dimer of methacrolein, 2,5-dimethyl-3,4-dihydro-1,2-pyran-2-carboxaldehyde, were mixed with methanol in a 1:2 molar ratio, and to the mixture there was added 1 per cent by volume of a 0.7 N solution of hydrogen chloride in methanol. An exothermic reaction occurred. After one hour at 35° C. to 40° C., the mixture was neutralized by addition of calcium carbonate, filtered, and distilled under a pressure of 10 millimeters of mercury. The following fractions were separated:

| Distillation Range, °C. | Amount, parts |
| --- | --- |
| 67.2 to 69.0 | 12 |
| 69.0 to 77.0 | 17 |
| 77.0 to 77.8 | 12 |
| 77.8 to 96.3 | 26 |
| bottoms | 2 |

Upon redistillation of the fraction collected between 67.2° C. and 69.0° C., there were recovered 6 parts of a mobile, essentially colorless liquid distilling at 66° C. to 66.5° C. under a pressure of 9.5 millimeters of mercury and containing 62.84 per cent carbon and 9.40 per cent hydrogen. It was identified as having the apparent structure of 7-methoxy-1,4-dimethyl-6,8-dioxabicyclo-[3.2.1]octane corresponding to the structural formula:

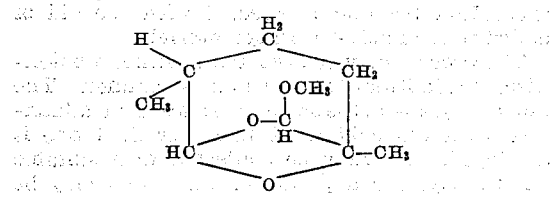

It is believed that this product was formed by reaction of the hemiacetal of the dimer (i. e., by reaction of 2,5-dimethyl-3,4-dihydro-1,2-pyran-2-(alpha-methoxy)methanol) to form, under the conditions of the experiment, the bicyclic structure represented in the formula. The higher boiling fractions separated in the experiment were found to contain, among other products, the product formed by addition of methanol to the olefinic bond of the dihydropyran ring, i. e., 6-methoxy-2,5-dimethyltetrahydropyran-2-carboxaldehyde, and also its dimethyl acetal.

Alkoxy groups other than methoxy may be introduced in a similar manner by substituting for the methanol other alcohols, such as ethyl alcohol, butyl alcohol, allyl alcohol, benzyl alcohol, cyclohexanol, etc.

*Example IV*

To a quantity of 3,4-dihydro-1,2-pyran-2-methanol in a distillation flask there was added about 0.5% by weight of p-toluene sulfonic acid. An exothermic reaction ensued which warmed the contents of the flask to about 90° C. When the reaction subsided, the mixture was fractionally distilled under reduced pressure, the distillate being condensed in a water-cooled condenser at about 55° C. The fraction which distilled at a vapor temperature of 73° C. to 76° C. under 48 millimeters mercury pressure solidified upon cooling to room temperature. On redistillation, purified product was collected as the fraction distilling at 91.0 to 91.6° C. under 100 millimeters of mercury. The 6,8-dioxabicyclo[3.2.1]octane thus prepared was a white waxy solid at room temperatures, melting at 50° C. to 52° C., and having a pleasant camphoraceous odor. Its structure would be represented by the formula

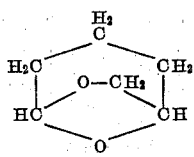

In this experiment, the product prepared was found to contain 62.98% carbon and 8.80% hydrogen, compared to the values of 63.16% carbon and 8.85% hydrogen calculated for the formula $C_6H_{10}O_2$.

*Example V*

In a flask there was mixed 34 parts of 3,4-dihydro-1,2-pyran-2-carboxaldehyde and 36 parts of glacial acetic acid. To the mixture there was added about 0.5% by weight of an about 15% solution of sulfuric acid in glacial acetic acid. An exothermic reaction ensued. The temperature of the reaction mixture was held by cooling below 60° C. After about one hour, when the reaction had subsided, the sulfuric acid was neutralized by addition of a small amount of sodium acetate and the dark viscous liquid was fractionally distilled. After removal of acetic acid forerun, there was collected 20 parts of water insoluble product distilling at 81° C. to 82° C. under 2 millimeters mercury pressure and having a refractive index ($n_D^{20}$) of 1.4570. Upon redistillation, the product was collected at 78° C. under 1 millimeter mercury pressure. The product was identified as having the apparent structure

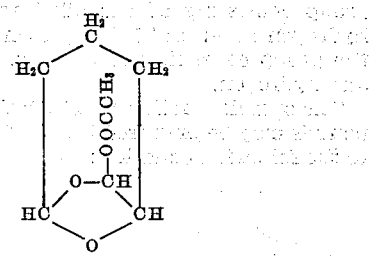

of 7-acetoxy-6,8-dioxabicyclo[3.2.1]octane. The product thus prepared was found to contain 55.39% carbon and 7.06% hydrogen, compared to values of 55.79% carbon and 7.03% hydrogen calculated for the above formula. The absence in the infra-red absorption spectrum of the product, of absorption bonds attributable to C=C bonds, and the presence of absorption bonds arising from $$-\overset{O}{\underset{\|}{C}}-O-$$

further confirmed the designated structure. In this experiment, it seems likely that the acetic acid reacted with the 3,4-dihydro-1,2-pyran-2-carboxaldehyde to form 3,4-dihydro-1,2-pyran-2-methanol having one hydrogen atom of the methanol group replaced by the acetoxy group, and that this mono-ester of the aldehyde hydrate was converted in the presence of sulfuric acid to the 7-acetoxy-6,8-dioxabicyclo[3.2.1]octane. These probable reactions would be as follows:

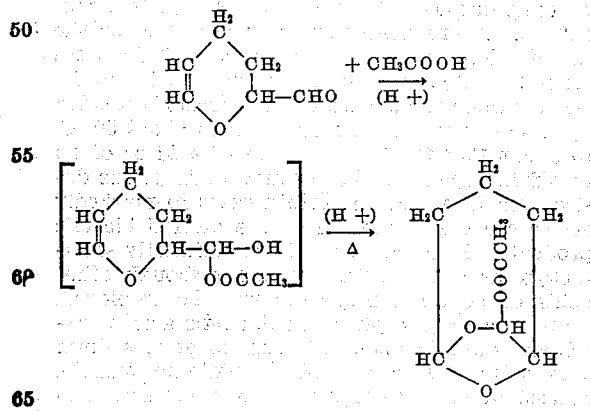

In place of the acetoxy group, other acyloxy groups may be introduced in a similar manner by substituting for the acetic acid higher carboxylic acids, such as any of the fatty acid series, as butyric acid, acrylic acid, decanoic acid, oleic acid, stearic acid, etc., or even cycloaliphatic carboxylic acids or aryl carboxylic acids, such as cyclopentane carboxylic acid, benzoic acid, and various substitution products thereof.

The novel products referred to in the examples and elsewhere in the specification will be seen to have structures corresponding to the structural formula

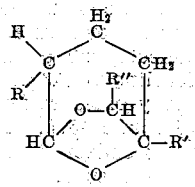

in which R and R' represent members of the group consisting of the alkyl radicals and the hydrogen atom and R'' represents a member of the group consisting of acyloxy, hydrocarbyloxy and hydrogen.

The overall reaction by which the present compounds may be prepared is thought to correspond to the following equation:

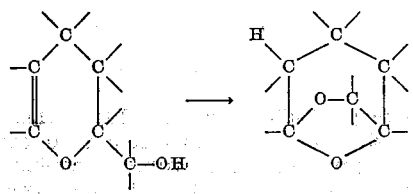

The foregoing reaction may in general be effected by subjecting the dihydropyran derivative to conditions of elevated temperature and/or to suitable conditions of acidity, for sufficient time. The reactions may be effected with the dihydropyran derivative in an essentially pure state, or the desired reaction may be effected in the presence of a solvent or dispersing medium, such as a suitable organic solvent. Alcohols, ethers, ketones, esters, the aliphatic and the aromatic hydrocarbons, halogenated hydrocarbons, and the like, are suitable solvent media. Water may be present in the reaction medium in amounts that are not excessive and that preferably constitute not more than a minor proportion of the total mixture.

The above reactions may be effected by heating the derivative of dihydropyran in the absence of any added acid or added acid-reacting material to temperatures of from about 35° C. to about 200° C. A preferred temperature range for the preparation of 6,8 - dioxabicyclo[3.2.1]octanes from 3,4-dihydro-1,2-pyran-2-methanol and its substitution products when the reaction is effected by the agency of heat alone is from about 50° C. to about 125° C. The presence of acid or of an acidifying agent has been found to favor the desired reaction, and in certain cases to markedly accelerate the formation of the desired bicyclic products. Hydrochloric acid is eminently satisfactory as the acidifying agent, although other acids or acid reacting salts may be employed. Sulfuric acid, phosphoric acid, acetic acid, paratoluene-sulfonic acid, chloroacetic acid, sodium acid sulfate, zinc chloride, aluminum sulfate, potassium dihydrogen phosphate and other acidifying materials thus also may be employed. The amount of the acidifying agent that is employed may be from a mere trace up to an amount more than molecularly equivalent to the amount of dihydropyran derivative that is present. Generally speaking, amounts of the acid-reacting material up to about 10 per cent by weight of the dihydropyran are preferable. When the cyclization reaction is effected with the aid of an added acid or acid-reacting material, there desirably are employed lower temperatures than when no added acid or acid-reacting material is present. The desired cyclization reactions may be effected at room temperatures or below by treatment of the dihydropyran derivative with a strong mineral acid in the above indicated quantities. Generally speaking, it is preferred to employ temperatures of from about 0° C. to about 75° C. when the cyclization reaction is effected with the aid of added acids or acid-reacting materials.

The process may be executed in either a batchwise, intermittent, or continuous manner. The dihydropyran-methanol or derivative in admixture with the acid reacting material, if one is employed, thus may be subjected to a suitable temperature for a period of time that may be varied from a few minutes to several hours or more. In some cases, the dihydropyran-methanol or derivative may be subjected directly to distillation, the heat required for the distillation also serving to cause the desired cyclization reaction to take place. The dihydropyran-methanol derivative may be formed in situ and need not be isolated. This procedure is illustrated in certain of the examples. In other cases, the dihydropyran-methanol or derivative, either in the essentially pure state or, as illustrated in certain of the examples, in the form of a solution in a suitable solvent, may be treated with an acid such as a strong mineral acid in an effective amount. After the reaction is completed, the acid may be neutralized by the addition of a base or other alkaline materials or it may be removed by adsorption on a suitable adsorbent. After completion of the reaction, the 6,8-dioxabicyclo-[3.2.1]octane compound may be recovered in any suitable manner from the reaction mixture and/or other possible products formed during the treatment. Treatment with selective solvents, fractional distillation, fractional crystallization, for example at low temperatures, and other known methods may be employed to recover the desired products of the reaction.

As has been indicated in the previous discussion herein of the invention, a wide variety of oxygen-containing, bicyclic, heterocyclic compounds containing the structural unit defined in a preceding paragraph, may be prepared by the process of the invention. From the standpoint of the convenience with which they may be prepared, and the availability of the necessary raw materials, a preferred group of compounds in the present invention may be represented by the formula,

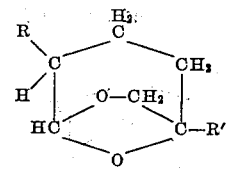

Formula V in which R and R' each represents either the hydrogen atom or a lower alkyl group. The preferred compounds may be prepared advantageously from the alpha,beta-unsaturated aldehydes having structures defined by the formula

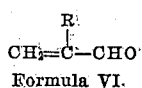

Formula VI.

in which R is as above, by means of the following reactions, the two R's being the same or different:

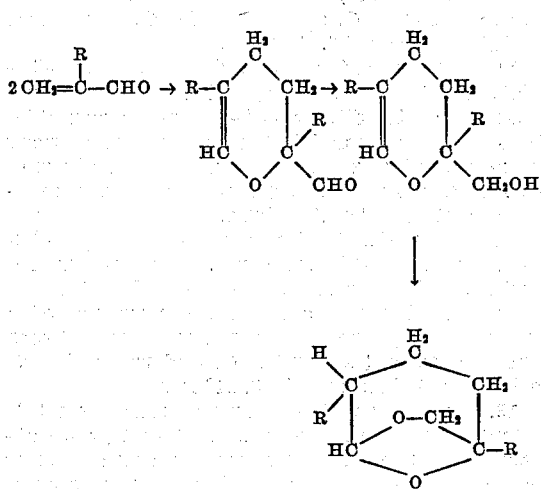

Acrolein, methacrolein, alpha-ethylacrolein or a homologous alpha,beta-unsaturated aldehyde having a structure defined by Formula VI, or a mixture of two or more such aldehydes, may be caused to react to form a dihydropyran carboxaldehyde as indicated in the preceding equations by heating in the presence of a polymerization inhibitor, such as hydroquinone, and a solvent, such as benzol. The resultant dihydropyran carboxaldehyde may be reduced at the formyl group to obtain the corresponding methanol-substituted dihydropyran. The reduction of the dihydropyran carboxaldehyde to the dihydropyran methanol may be effected catalytically, as by reaction with molecular hydrogen, or chemically as by treatment with aluminum alcoholate in the presence of alcohol. The preparation of dihydropyran carboxaldehydes and certain derivatives thereof from methacrolein, alpha-ethylacrolein and their homologs forms in part the subject matter of the copending application, Serial No. 713,455, filed December 2, 1946. This application is now Patent No. 2,479,283 issued August 16, 1949.

The compounds defined by Formula V, as well as other compounds provided by the present invention are of particular value as chemical intermediates for the preparation of derived organic chemicals. The compounds represented in Formulas IV and V may be regarded, from the standpoint of structure, as inner acetals of aliphatic dihydroxy aldehydes. Because of these distinguishing characteristics, which are reflected in certain of their chemical properties, the compounds represented in the present invention may be employed as raw materials for the preparation of numerous useful polyfunctional compounds. They may be hydrolyzed under suitable conditions to acyclic polyfunctional compounds. They are useful as raw materials for the preparation of hydroxylic aldehydes which, for example, may be reduced to polyhydric alcohols or otherwise employed to gainful ends. The bicyclic inner acetals represented in Formula V are in most cases clear, mobile liquids to soft, waxy solids having a relatively low degree of volatility under atmospheric pressures. They have a beneficent solvent and plasticizing action upon numerous substances. They appear to be of significant value as solvents in special applications and as plasticizers.

I claim as my invention:

1. A chemical compound having a structure defined by the formula

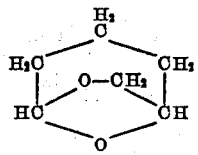

2. A chemical compound having a structure defined by the formula

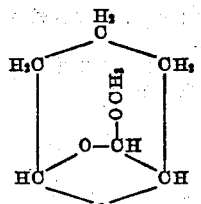

3. A chemical compound having a structure defined by the formula

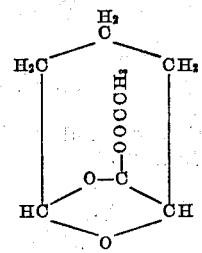

4. The chemical compounds having structures defined by the formula

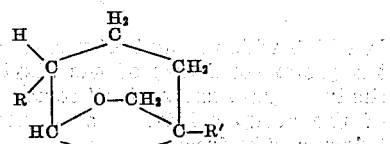

in which R and R' represent members of the group consisting of the alkyl radicals and the hydrogen atom.

5. A chemical compound having a structure defined by the formula

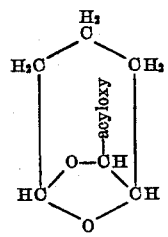

6. A chemical compound having a structure defined by the formula

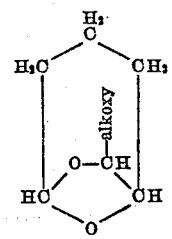

7. A chemical compound having a structure defined by the formula

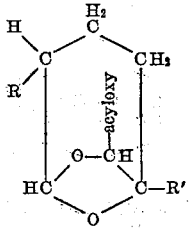

in which R and R' represent members of the group consisting of the alkyl radicals and the hydrogen atom.

8. A chemical compound having a structure defined by the formula

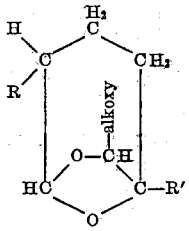

in which R and R' represent members of the group consisting of the alkyl radicals and the hydrogen atom.

9. A chemical compound having a structure defined by the formula

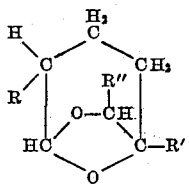

in which which R and R' represent members of the group consisting of the alkyl radicals and the hydrogen atom and R'' represents a member of the group consisting of acyloxy, hydrocarbyloxy and hydrogen.

10. A process which comprises treating 3,4-dihydro-1,2-pyran-2-methanol with an acid-reacting material of the class consisting of acids and acid-reacting salts at a temperature between about 0° C. and about 75° C. to produce 6,8-dioxabicyclo[3.2.1]octane.

11. The method of preparing a 7-alkoxy-6,8-dioxabicyclo[3.2.1]octane which comprises reacting a 3,4-dihydro-1,2-pyran-2-carboxaldehyde with an alcohol in the presence of a strong mineral acid at a temperature between about 0° C. and about 75° C. and recovering a 7-alkoxy-6,8-dioxabicyclo[3.2.1]octane.

12. The method of preparing 7-acetoxy-6,8-dioxabicyclo[3.2.1]octane which comprises reacting 3,4-dihydro-1,2-pyran - 2 - carboxaldehyde with glacial acetic acid in the presence of a strong mineral acid at a temperature between about 0° C. and about 75° C. and recovering 7-acetoxy-6,8-dioxabicyclo[3.2.1]octane.

13. A process which comprises reacting a 3,4-dihydro-1,2-pyran having a methanol group attached to the saturated carbon atom that is bonded to the oxygen atom in the dihydropyran ring in the presence of an acid-reacting material of the class consisting of acids and acid-reacting salts at a temperature within the range of from about 35° C. to about 200° C. to produce a 6,8-dioxabicyclo[3.2.1]octane compound.

14. A process which comprises reacting a 3,4-hydro-1,2-pyran having a methanol group attached to the saturated carbon atom that is bonded to the oxygen atom in the dihydropyran ring at a temperature within the range of from about 35° C. to about 200° C. to produce a 6,8-dioxabicyclo[3.2.1]octane compound.

15. The method of preparing a 7-acyloxy-6,8-dioxabicyclo[3.2.1]octane which comprises reacting a 3,4-dihydro-1,2-pyran-2-carboxaldehyde with a carboxylic acid in the presence of a strong mineral acid at a temperature between about 0° C. and about 75° C. and recovering a 7-acyloxy-6,8-dioxyabicyclo[3.2.1]octane.

RICHARD R. WHETSTONE.

No references cited.